United States Patent [19]

Keppler et al.

[11] 3,956,218

[45] May 11, 1976

[54] AGGLOMERATING AQUEOUS DISPERSIONS OF SYNTHETIC RUBBER

[75] Inventors: Hans Georg Keppler, Weinheim; Hermann Wesslau, Bad Durkheim, both of Germany

[73] Assignee: Badische Anilin- & Soda-Fabrik Aktiengesellschaft, Ludwigshafen (Rhine), Germany

[22] Filed: Oct. 26, 1971

[21] Appl. No.: 192,566

Related U.S. Application Data

[63] Continuation of Ser. No. 725,915, May 1, 1968, abandoned.

[30] Foreign Application Priority Data

May 5, 1967  Germany............................ 1720058

[52] U.S. Cl.................... 260/29.7 D; 260/29.6 TA; 260/29.6 H; 260/29.7 W; 260/29.7 UP; 260/29.7 H; 260/29.7 T; 260/894
[51] Int. Cl.²......................... C08L 9/08; C08L 9/10
[58] Field of Search............ 260/29.7 PT, 29.6 RW, 260/29.7 D

[56] References Cited
UNITED STATES PATENTS

| | | | |
|---|---|---|---|
| 2,138,073 | 11/1938 | Schweitzer.................. | 160/29.7 PT |
| 2,446,107 | 7/1948 | Rumbold...................... | 260/29.7 PT |
| 2,883,351 | 4/1959 | Uraneck et al. ............. | 260/29.7 PT |
| 2,927,095 | 3/1960 | Witt.............................. | 260/29.7 PT |
| 3,002,940 | 10/1961 | Holloway...................... | 260/29.7 PT |
| 3,014,040 | 12/1961 | Howland et al.............. | 260/29.7 PT |
| 3,037,952 | 6/1962 | Jordan et al................ | 260/29.6 RW |
| 3,084,067 | 4/1963 | Smith........................... | 260/29.7 PT |
| 3,356,627 | 12/1967 | Scott............................. | 260/29.7 PT |

*Primary Examiner*—Murray Tillman
*Assistant Examiner*—A. H. Koeckert
*Attorney, Agent, or Firm*—Johnston, Keil, Thompson & Shurtleff

[57] ABSTRACT

Mixtures of aqueous synthetic rubber dispersions of alkali-insoluble copolymers of minor amounts of ethylenically unsaturated monomers (a) which form water-soluble hompolymers and major amounts of ethylenically unsaturated monomers (b) which form water-insoluble homopolymers have large particle size and are less viscous and easier to process than aqueous dispersions of the same solids concentration having small particle size.

2 Claims, No Drawings

AGGLOMERATING AQUEOUS DISPERSIONS OF SYNTHETIC RUBBER

This is a continuation of application Ser. No. 725,915, filed May 1, 1968, now abandoned.

Synthetic rubber dispersions in general have extremely small particle size. Their viscosity is therefore so high, even when the solids content is relatively low, that they are difficult to handle. Latices having solids contents of at least 60% by weight are however of particular advantage for some applications. Since dispersions having large particles can be brought to higher concentrations for a given viscosity then dispersions having small particles, attempts have been made to change the particle size of a latex during or after polymerization. Thus for example further emulsifier may be added continuously during the emulsion polymerization in order to obtain large particles of polymer. The whole polymerization is however then carried out on the brink of coagulation and the polymerization proceeds extremely slowly (compare Houben-Weyl, "Methoden der organischen Chemie", volume 14/1, 1961 edition, pages 352 and 686).

In the method known from UK Patent Specification No. 758,622 — agglomeration by freezing — the synthetic rubber dispersion is frozen by strong cooling and thawed again some time later. The method has the disadvantage that it requires extremely large amounts of energy.

It is also known that dispersions of butadiene copolymers can be agglomerated by adding electrolytes, organic solvents or water-soluble substances of high molecular weight, such as polyvinyl alcohol, polyvinyl methyl ether and methylcellulose, and it is often necessary to alter the pH value at the same time. All these methods have the disadvantage that they are difficult to carry out and often result in the formation of considerable amounts of coagulate.

We have now found that aqueous dispersions of synthetic rubber can be agglomerated particularly simply using high molecular weight agglomerating agents when an aqueous dispersion of an alkali-insoluble copolymer (A) is used which has been prepared from 0.5 to 25% by weight with reference to the copolymer (A) of at least one ethylenically unsaturated monomer (a) which forms water-soluble homopolymers and 99.5 to 75% by weight with reference to the copolymer (A) of at least one ethylenically unsaturated monomer (b) which forms water-insoluble homopolymers of which up to 7.9% by weight with reference to the monomer(s) (b) may be an ester of acrylic and/or methacrylic acid with an alkanol containing one to four carbon atoms and/or a copolymer (B) which has been prepared from 0.5 to 25% by weight (with reference to copolymer (B) of at least one ethylenically unsaturated monomer (a) which forms water-soluble homopolymers, of which up to 12% by weight (with reference to the copolymer (B)) may be acrylic and/or methacrylic acid and 99.5 to 75% by weight (with reference to the copolymer (B)) of at least one ethylenically unsaturated monomer (b) of which at least 8% by weight (with reference to the monomer(s) (b)) is an ester of acrylic and/or methacrylic acid with an alkanol having one to four carbon atoms, 0.1 to 30 parts by weight of the dispersed copolymer (A) and/or (B) being used to 100 parts by weight of the dispersed synthetic rubber.

The synthetic rubber dispersions may be prepared by conventional methods of emulsion polymerization using conventional emulsifiers and dispersing agents from 1,3-dienes, such as butadiene, isoprene, piperylene, 2,3-dimethylbutadiene, chloroprene and preferably butadiene by homopolymerization or copolymerization of the said dienes with other olefinically unsaturated copolymerizable monomers. Examples of comonomers are vinylaromatic compounds, such as styrene, vinyltoluene, vinylxylenes, α-methylstyrene, vinylethylbenzenes, chlorostyrenes, acrylonitrile, esters of olefinically unsaturated carboxylic acids containing at least three carbon atoms, such as acrylic acid, methacrylic acid, crotonic acid, maleic acid, fumaric acid and itaconic acid, with alkanols containing one to twelve carbon atoms or with cycloalkanols such as cyclohexanol. Styrene and/or acrylonitrile are of particular interest as comonomers for butadiene, particularly in amounts of 20 to 70% by weight with reference to the butadiene copolymer. The polymers herein referred to as synthetic rubber in general have glass temperatures below 20°C, preferably below 0°C. A dispersion of a copolymer of 60% of styrene and 40% of butadiene has a glass temperature below 0°C and a dispersion of a copolymer of 80% of n-butyl acrylate and 20% of butadiene has a glass temperature of below −50°C; they therefore come within the scope of the present invention. The type of emulsifier system used for the production of the synthetic rubber dispersion is not critical for the new process.

The emulsifier content of the synthetic rubber dispersion or the degree of saturation of the latex with emulsifier is however important for the degree of the agglomeration. The degree of saturation can be determined for example by soap titration according to Houben Weyl, "Methoden der organischen Chemie", volume 14/1, page 370. In this method the latex has added to it in portions an aqueous solution of the emulsifier which has been used for its preparation. The end point is reached when the surface tension of the mixture does not fall any further upon a further addition. If T milliliters of emulsifier solution has been used up and the sample used at first contains A milliliters of emulsifier solution, the degree of saturation of the latex $$S = A/(A + T) \times 100\%.$$

The higher the degree of saturation of the synthetic rubber dispersion, the lower in general is the agglomeration effect of a given amount of agglomerating agent.

The polymer content of the synthetic rubber dispersion may be varied within wide limits. In general the effect of an agglomerating agent decreases with decreasing polymer content in the synthetic rubber dispersion. Agglomeration of 20 to 50% synthetic rubber dispersions offers no difficulty. In the case of a polymer content of the synthetic rubber dispersion of less than 20% by weight, the effectiveness of the agglomerating agents is often less.

Particularly effective agglomerating agents, for example a dispersion of a copolymer (B) of 95 parts of ethyl acrylate and 5 parts of acrylamide, have an agglomerating action even in the case of synthetic rubber dispersions having very low polymer contents, but in general the effect is only slight in the case of polymer contents of less than 10% by weight. Polymer contents of the synthetic rubber dispersions of more than 15%, in particular from 20 to 55% by weight are preferred.

The pH value of the synthetic rubber dispersions is only important when salt-forming agglomerating agents are used. Agglomerating agents containing carboxy groups are for example particularly effective in the alkaline range. Basic agglomerating agents on the other hand are particularly effective in the acid pH range. Obviously when using pH values of less then 7 the emulsifier of the synthetic rubber dispersion must be effective in the acid range. Examples of such emulsifiers are lauryl sulfate, p-isooctylbenzene sulfonate, dodecylsulfonic acid and the sulfuric acid hemiesters of reaction products of p-isooctylphenol with alkylene oxides, such as ethylene oxide.

In general 0.1 to 30, preferably 0.5 to 5, parts by weight of copolymer (A) and/or (B) (to 100 parts by weight of solid synthetic rubber) is added in the form of an aqueous dispersion in this process to the synthetic rubber dispersion and the concentration of the copolymers (A) and (B) in the added dispersion may be varied within wide limits.

The copolymers (A) and (B) contain units of ethylenically unsaturated monomers (a) which when polymerized by themselves give homopolymers which are soluble in water. Examples of these monomers are ethylenically unsaturated monocarboxylic and dicarboxylic acids having at least three carbon atoms, such as acrylic acid, methacrylic acid, crotonic acid, maleic acid, fumaric acid, itaconic acid, glutaconic acid, 3-methylglutaconic acid, muconic acid, dihydromuconic acid, methylenemalonic acid, citraconic acid, mesaconic acid, methyleneglutaric acid and their alkali metal, alkaline earth metal and ammonium salts, and also the himiesters of unsaturated dicarboxylic acids of the said type and their salts, ethylenically unsaturated amides, N-alkylamides having one to four carbon atoms in the alkyl radicals, N-methylolamides and their alkyl ethers such as acrylamide, methacrylamide, N-methylacrylamide, N-diethylacrylamide, the monoamides and diamides and also the ester amides of maleic, fumaric and itaconic acids and of the other abovementioned ethylenically unsaturated dicarboxylic acids and their salts, N-methylolacrylamide and N-methylolmethacrylamide, the ethers of such N-methylolamide compounds provided they are hydrophilic, for example the methyl, ethyl, 3-oxabutyl, 3,6-dioxaheptyl and 3,6,9-trioxadecyl ethers and ethylene oxide adducts of such N-methylol compounds, for example of N-methylolacrylamide, N-methylolmethacrylamide and N-methylolmaleimide, and also N-vinylamides such as N-vinylacetamide and N-vinylpyrrolidone; ethylenically unsaturated polyhydroxyl compounds, for example hemiesters of ethylenically unsaturated acids with glycols and polyglycols such as ethylene glycol, propylene glycol-1,2 , propylene glycol-1,3, butylene glycol-1,2, butylene glycol-1,4, diethylene glycol, triethylene glycol and tetraethylene glycol; ethylenically unsaturated monomers having basic nitrogen atoms, for example vinylimidazole, vinylpyridine, vinylpyridine, 2-N-dimethylaminoethyl acrylate, Mannich bases from acrylamide and methacrylamide, formaldehyde and dialkylamines whose alkyl groups contain one to twelve carbon atoms and their ammonium salts and ethylenically unsaturated quaternary ammonium compounds, such as N-methylvinylpyridinium sulfate and N-methyl-N-vinylimidazolinium chloride; also ethylenically unsaturated sulfonic acids and their alkali metal, alkaline earth metal or ammonium salts, for example vinylsulfonic acid, styrene sulfonic acid and the acrylic and methacrylic esters of hydroxyalkylsulfonic acids, for example ethionic acid. Monoethylenically unsaturated monocarboxylic and dicarboxylic acids having three to five carbon atoms and their amides, ammonium salts, sodium salts and potassium salts are of particular interest as monomers which form water-soluble homopolymers.

For copolymerization with such monomers (a) it is possible to use practically any polar or nonpolar ethylenically unsaturated monomer (b) provided it forms water-insoluble homopolymers or forms water-insoluble copolymers with the monomers (a). Examples of such comonomers (b) are the esters and nitriles of unsaturated carboxylic acids having at least three carbon atoms such as the acrylic and methacrylic esters of unsubstituted or substituted alkanols and cycloalkanols, for example of methanol, ethanol, n-propanol, isopropanol, the butanols, amyl alcohols and hexanols, of 2-ethylhexyl alcohol, cyclohexanol, methylcyclohexanol, β-phenylethanol, 2-cyanoethanol, 2-chloroethanol, cyclodecanol, cyclododecanol and stearyl alcohol, and also acrylonitrile and methacrylonitrile. Other suitable comonomers are vinylaromatics such as styrene, α-methylstyrene, vinyltoluenes, ethylstyrene, 2-chlorostyrene, 2,4-dichlorostyrene and vinylnaphthalene, vinyl esters such as vinyl acetate, vinyl propionate, the vinyl esters of carboxylic acids prepared by reaction of olefins with carbon monoxide and water in the presence of sulfuric acid (for example of trimethylacetic acid or of the mixture or acids obtained by reaction of a mixture of diisobutylene and triisobutylene with carbon monoxide and water in the presence of acid catalysts), vinyl ethers of alkanols having one to twelve carbon atoms, for example of methanol, ethanol, propanol, the butanols or 2-ethylhexanol, vinyl halides such as vinyl chloride and vinylidene chloride, and 1,3-dienes such as butadiene, isoprene, piperylene and 2-chlorobutadiene.

The copolymers (A) should contain only up to 7.9% by weight (with reference to the monomers (b)) of units of esters of acrylic acid and/or methacrylic acid with alkanols containing one to four carbon atoms and the copolymers (B) should contain at least 8% by weight of these esters. Moreover only up to 12% by weight (with reference to the copolymer (B)) of acrylic acid or methacrylic acid should be used for the production of this copolymer.

Copolymers (A) and (B) of acrylic esters and/or methacrylic esters of alkanols containing one to four carbon atoms, for example of methanol, ethanol, n-butanol and isobutanol, and styrene, butadiene vinyl acetate, vinyl propionate and maleic esters and fumaric esters of alkanols having one to four carbon atoms as monomers (b), with acrylic acid, methacrylic acid, acrylamide, methacrylamide, N-methylolacrylamide and/or N-methylolmethacrylamide as monomers (a) are preferred.

The optimum ratio of monomers (a) to monomers (b) in the agglomerating agents are different in each case. The agglomerating effect is greater the more polar the agglomerating agent is. For example the agglomerating effect of an aqueous dispersion of a copolymer of 95% by weight of ethyl acrylate and 5% by weight of acrylic acid is only slight at pH 3. It is greatly increased when the polarity of the hydrophilic carboxy groups is increased by converting them into carboxylate ions by adding for example aqueous ammonia solution. A dispersion of a copolymer of 97 parts of ethyl acrylate and 3 parts of acrylic acid has good effectiveness at pH 9 to 10. Emulsion copolymers from acrylic acid and styrene which is much less polar than ethyl acrylate require a content of at least 5%, preferably 10 to 20%, by weight of acrylic acid even in the basic range.

The agglomerating agent may be prepared by conventional methods of emulsion polymerization. In a particular embodiment, agglomerating agents are used in whose preparation some of the monomer (b) is first polymerized and then a mixture of monomers (a) and (b) is polymerized onto the resultant seed latex. Such agglomerating agents are highly effective even when they contain only a small amount of polymerized units of monomer (a).

In another embodiment there is used as agglomerating agent a copolymer dispersion on whose latex particles hydrophilic groups (such as otherwise are introduced by monomers (a)) are produced by chemical reactions, for example by hydrolysis of polymerized units of esters or nitriles of unsaturated acids having at least three carbon atoms after the polymerization. When dispersions of homopolymers or copolymers of vinyl esters are used as starting materials, agglomerating agents which have hydroxy groups as hydrophilic groups are obtained by hydrolysis. A highly effective agglomerating agent can be obtained for example by partial hydrolysis of a dispersion of polyvinyl acetate in an acid medium.

Agglomerating agents whose composition differs only slightly from that of the synthetic rubber to be agglomerated are preferred. For example if a synthetic rubber dispersion from 70% by weight of butadiene and 30% by weight of styrene is to be agglomerated, it is preferred to use as agglomerating agent a dispersion of a copolymer which contains polymerized units of butadiene, styrene and a monomer (a) in about the same proportions, i.e. for example a dispersion of a copolymer of 60% by weight of butadiene, 25% by weight of styrene and 15% by weight of acrylic acid; or a copolymer of 65% by weight of butadiene, 28% by weight of styrene and 7% by weight of N-methylolmethacrylamide. Agglomerating agents which have been obtained by polymerizing a small amount of a mixture of butadiene, styrene or acrylonitrile and 5 to 20% by weight of the mixture of monomers (a), particularly acrylic acid or N-methylolmethacrylamide, onto a synthetic rubber dispersion having the same composition as the synthetic rubber dispersion to be agglomerated, are particularly preferred.

The agglomerating agent in general contains more than 1%, preferably 2 to 25%, by weight of monomer (a) units. In some cases a content of only 0.1 to 1% by weight of hydrophilic monomer is enough, particularly when this is polymerized together with other monomers onto a backbone polymer which contains only few or no polymerized units of hydrophilic monomers. The particles of polymer of the agglomerating agent should preferably be more hydrophilic than the dispersed particles of the synthetic rubber.

The agglomeration is effected by mixing the dispersion of the synthetic rubber with the agglomerating agent. The way in which the dispersion of the agglomerating agent is added influences particularly the particle size distribution of the agglomerated synthetic rubber dispersion which has a marked influence on the flowability of highly concentrated dispersions. In general the particle size distribution is broader the more slowly agglomeration is carried out. Particularly narrow and sometimes bimodal particle size distribution is obtained for example when the synthetic rubber dispersion is mixed at a pH value of less than 4 with an agglomerating agent containing polymerized units of acrylic acid and the pH value of the mixture is then adjusted to 7 to 9 rapidly by adding ammonia gas while stirring. A particularly broad distribution is obtained by stirring highly effective agglomerating agents in very slowly.

The mixture of the synthetic rubber dispersion and the agglomerating agent may, if desired, be concentrated by a conventional method, for example by evaporating off some of the water, by centrifuging, by creaming or by the electrodecantation method. Concentration may for example be effected immediately after the mixing of the dispersion. It may however be carried out at any other time.

The new agglomerating process may in general be carried out at room temperature, i.e. at a temperature of from 15° to 35°C. Higher temperatures, if necessary up to just below the boiling point, are advantageous in the case of agglomerating agents having a weak action. Temperatures down to the freezing point of the dispersion are in general possible in the process, but are not usually advantageous.

Very stable and coagulate-free dispersions which can readily be concentrated to more than 65% solids content can be obtained by the process according to this invention without the dispersions losing their flowability. The process is particularly simple and reliable and enables synthetic rubber dispersions to be agglomerated which have been prepared with any emulsifier, including acid dispersions. The extent of the agglomeration and particularly the particle size distribution may be varied practically without limit by appropriate choice of agglomerating agent, the mixing conditions and the degree of saturation of the synthetic rubber dispersions with emulsifier.

The agglomerated synthetic rubber dispersions are particularly suitable for the production of coatings, adhesives, foam rubber and expanded coatings, for example of woven and nonwoven fibrous materials such as woven cloth, nonwovens and backings for floorcoverings.

The invention is further illustrated in the following Examples.

In the Examples the light transmittance value (LT) and surface tension (ST) are given as measures of the agglomerating effect. The LT value indicates what percentage of white light passes through a layer 1 cm thickness of a 0.01% dispersion onto a photocell as compared with pure distilled water under the same conditions. The lower the LT value is, the greater is the mean particle size. Surface tension of the synthetic rubber dispersion falls during agglomeration. The difference between the surface tension of the synthetic rubber dispersion before and after agglomeration is therefore a measure of the decrease in the surface area of the particles which occurs during agglomeration.

In the Examples the monomers used for the copolymers are abbreviated as follows:

Bu = butadiene
PBu = polybutadiene
St = styrene
AA = acrylic acid
MAA = methacrylic acid
MAM = methacrylamide
MOMAM = N-methylolmethacrylamide
N = acrylonitrile
VP = N-vinylpyrrolidone
BDM = butanediol monoacrylate BDD = butanediol diacrylate
BA = butyl acrylate
VA = vinyl acetate the synthetic rubber, the duration of the treatment and the LT and ST values are given in the following Table 2.

Table 2

| No | Rubber | Time | LT(B) | ST(B) | LT(E) | ST(E) |
| --- | --- | --- | --- | --- | --- | --- |
| 13 | 60 BA; 35 Bu; 5 VME | 2 | 95 | 66 | 5 | 38 |
| 14 | PBU | 2 | 88 | 70 | 4 | 42 |
| 15 | 58.8 Bu; 39.2 St; 2 MAM | 5 | 66 | 60 | 10 | 35 |
| 16 | 72 Bu; 25 N; 3 AA | 4 | 78 | 40 | 14 | 27 |

EA = ethyl acrylate
VME = vinyl methyl ether.
Other abbreviations used in the Example are:
Agg = composition in % of the agglomerating agent
Amount = amount of agglomerating agent in parts per 100 parts of synthetic rubber
Time = duration of treatment in hours
No = Example No.
Temp = temperature in °C
LT = light transmittance in %
ST = surface tension in dynes/cm
S.Rubber = composition of synthetic rubber in parts
(B) = at the beginning
(E) = at the end
(2) = after 2 hours
(24) = after 24 hours.
The parts and percentages given in the Examples are by weight.

EXAMPLES 1 to 12

In each case 100 parts of a 30% aqueous dispersion having the LT value 93 and a ST of 69 of a synthetic rubber from 71.5% of Bu and 28.5% of St is mixed with 4.5 or 9 parts of a 10% aqueous dispersion of an agglomerating agent equivalent to 1.5 or 3 parts of agglomerating agent copolymer to 100 parts of synthetic rubber and the pH value is adjusted to from 9 to 10 by adding aqueous ammonia solution. The composition of the agglomerating agent, the amount thereof and the duration and temperature of the treatment are given in the following Table together with the LT and ST values measured after the treatment.

Table 1

| No. | Agg | Amount | Time | Temp | LT | ST |
| --- | --- | --- | --- | --- | --- | --- |
| 1 | 59 Bu; 21 St; 20 MAA | 1.5 | 3.5 | 20 | 4 | 37 |
| 2 | 80 St; 20 AA | 1.5 | 2 | 20 | 6 | 49 |
| 3 | 96 EA; 4 AA | 3 | 3 | 20 | 6 | 36 |
| 4 | 95 EA; 5 MAM | 3 | 7 | 20 | 7 | 51 |
| 5 | 95 EA; 5 VP | 3 | 7 | 20 | 8 | 58 |
| 6 | 90 St; 10 AA | 3 | 2 | 60 | 4 | 46 |
| 7 | 77.7 St; 19.3 AA; 3 BDD | 1.5 | 3 | 60 | 6 | 57 |
| 8 | 67 Bu; 24 St; 9 AA | 3 | 2 | 20 | 7 | 48 |
| 9 | 91.5 EA; 6.5 AA; 2.0 MOMAM | 3 | 3 | 20 | 6 | 36 |
| 10 | 53.5 BA; 44 VA; 2.5 AA | 3 | 1 | 20 | 3 | 35 |
| 11 | 65 Bu; 30 N; 5 MOMAM | 3 | 3 | 20 | 15 | 64 |
| 12 | 90 EA; 10 BDM | 3 | 4 | 60 | 36 | 64 |

EXAMPLES 13 to 16

In each case 100 parts of 30% aqueous synthetic rubber dispersion has added to it, as an agglomerating agent, 9 parts of a 10% aqueous dispersion of a copolymer of 59 parts of Bu, 21 parts of St and 20 parts of MAA (Examples 13 to 15) or 94 parts of EA and 5 parts of AA (Example 16) — equivalent to 3 parts of agglomerating agent to 100 parts of synthetic rubber. The whole is kept for some time at 20°C (Examples 13, 14 and 16) or 60°C (Example 15). The composition of

EXAMPLES 17 and 18

In each case there is added to 100 parts of an aqueous 30% dispersion having the LT value 95% and the ST value 69 dynes/cm of a synthetic rubber from 76.5 parts of Bu and 23.5 parts of St, as agglomerating agent, 9 parts of an aqueous 10% dispersion of a statistical copolymer (a) and a graft copolymer (b) having the same empirical composition, namely 98 parts of EA and 2 parts of AA. The graft copolymer is prepared by polymerizing a mixture of 33 parts of EA and 1.5 parts of AA in aqueous emulsion onto a previously prepared statistical emulsion copolymer of 65 parts of EA and 0.5 part of AA.

The mixture is kept at room temperature for twenty-four hours and its LT and ST values are determined after two and twenty-four hours. The results are given in the following Table 3:

Table 3

| No | Agg | LT(2) | ST(2) | LT(24) | ST(24) |
| --- | --- | --- | --- | --- | --- |
| 17 | (a) | 72 | 47.5 | 64 | 44 |
| 18 | (b) | 8 | 42 | 8 | 42 |

Comparison of the LT and ST values shows the superiority of the graft copolymer (b) over the statistical copolymer (a) having the same empirical composition.

What we claim is:

1. An aqueous synthetic rubber dispersion comprising an aqueous dispersion of particles of polybutadiene or a synthetic rubber copolymer in which the monomer units consist of at least 20% by weight of butadiene, said copolymer having a glass temperature below 20°C, and said particles being agglomerated by dispersion in said synthetic rubber dispersion of an alkali insoluble copolymer, said synthetic rubber copolymer being a copolymer of at least 20% by weight of butadiene copolymerized with, as the remainder of said copolymer, at least one of styrene, acrylonitrile, n-butylacrylate, vinylmethylether, methacrylamide and acrylic acid, and said alkali insoluble copolymer is a copolymer of 75–99.9% by weight of ethyl acrylate and 0.5–25% by weight of acrylamide, the percentage totalling 100%, 0.1 to 30 parts by weight of the copolymer being used per 100 parts by weight of the dispersed synthetic rubber, and the particles of said alkali insoluble copolymer being more hydrophilic than the dispersed particles of said synthetic rubber.

2. An aqueous synthetic rubber dispersion comprising an aqueous dispersion of particles of polybutadiene homopolymer, and said particles being agglomerated by dispersion in said synthetic rubber dispersion of an alkali insoluble copolymer, said alkali insoluble copolymer being a copolymer of (a) 0.5 to 25% by weight of acrylic acid, methacrylic acid, acrylamide, methacrylamide, N-methylolacrylamide, N-methylolmethacrylamide, N-vinylpyrrolidone, butanediol diacrylate or butanediol monoacrylate and (b) 99.5 to 75% by weight of styrene, butadiene, vinyl acetate, or an ester of acrylic or methacrylic acid with an alkanol having one to four carbon atoms, said percentages for (a) and (b) totalling 100%, 0.1 to 30 parts by weight of the alkali insoluble copolymer being used per 100 parts by weight of the dispersed polybutadiene homopolymer, and the particles of said alkali insoluble copolymer being more hydrophilic than the dispersed particles of said polybutadiene homopolymer.

* * * * *

UNITED STATES PATENT AND TRADEMARK OFFICE
CERTIFICATE OF CORRECTION

PATENT NO. : 3,956,218
DATED : May 11, 1976
INVENTOR(S) : Hans Georg Keppler et al.

It is certified that error appears in the above-identified patent and that said Letters Patent are hereby corrected as shown below:

In the Abstract, Line 4, delete " soluble hompolymers ... " and substitute -- soluble homopolymers ... --

In Column 2, Line 43, delete " S=A/CA + T) × 100%. "

and substitute -- S=A/ (A+T) x 100%. --

Signed and Sealed this

Tenth Day of May 1977

[SEAL]

Attest:

RUTH C. MASON
Attesting Officer

C. MARSHALL DANN
Commissioner of Patents and Trademarks